(12) United States Patent
Hueller

(10) Patent No.: US 11,421,163 B2
(45) Date of Patent: Aug. 23, 2022

(54) DEVICE AND METHOD FOR DESULFURIZING CRUDE OIL

(71) Applicant: KNAUF GIPS KG, Iphofen (DE)

(72) Inventor: Rolf Hueller, Volkach (DE)

(73) Assignee: KNAUF GIPS KG

( * ) Notice: Subject to any disclaimer, the term of this patent is extended or adjusted under 35 U.S.C. 154(b) by 0 days.

(21) Appl. No.: 17/253,514

(22) PCT Filed: Jun. 6, 2019

(86) PCT No.: PCT/EP2019/064833
§ 371 (c)(1),
(2) Date: Dec. 17, 2020

(87) PCT Pub. No.: WO2019/243075
PCT Pub. Date: Dec. 26, 2019

(65) Prior Publication Data
US 2021/0246378 A1 Aug. 12, 2021

(30) Foreign Application Priority Data
Jun. 18, 2018 (DE) .................... 10 2018 114 536.5

(51) Int. Cl.
*C10G 45/02* (2006.01)
*C04B 28/14* (2006.01)
*C04B 11/26* (2006.01)

(52) U.S. Cl.
CPC ............ *C10G 45/02* (2013.01); *C04B 11/264* (2013.01); *C04B 28/14* (2013.01); *C10G 2300/202* (2013.01)

(58) Field of Classification Search
CPC .. C10G 45/02; C10G 2300/202; C04B 28/14; C04B 11/264; Y02E 20/12; C01F 11/46; C01B 17/0404
See application file for complete search history.

(56) References Cited

U.S. PATENT DOCUMENTS

| 4,884,396 A | 12/1989 | Miyamoto et al. |
| 4,917,024 A * | 4/1990 | Marten ............... C01B 17/0404 |
| | | 110/233 |
| 2014/0020399 A1* | 1/2014 | Hueller ................... F02C 3/22 |
| | | 60/772 |

FOREIGN PATENT DOCUMENTS

| DE | 102011002320 | 6/2012 |
| EP | 0781589 | 7/1997 |

(Continued)

OTHER PUBLICATIONS

Andrew M. Dunster, "Flue gas desulphurisation (FGD) gypsum in plasterboard manufacture", Nov. 30, 2007, retrieved from the internet: http://www.smartwaste.co.uk/filelibrary/Plasterboard_FGD_gypsum.pdf [retrieved on Apr. 17, 2012] XP055024708.

(Continued)

*Primary Examiner* — Randy Boyer
*Assistant Examiner* — Juan C Valencia
(74) *Attorney, Agent, or Firm* — Workman Nydegger

(57) ABSTRACT

A device for desulfurizing crude oil comprises a desulfurization system for sulfur-containing crude oil which forms a hydrogen sulfide-containing acid gas; a system for extracting elemental sulfur and a hydrogen sulfide-containing tail gas as exhaust gas from the acid gas; a device for generating electricity and gypsum from the tail gas; and a gas line system for supplying acid gas from the desulfurization system to the system and to the device, and for supplying tail gas from the system to the device. The gas line system has a gas distributing apparatus which supplies acid gas solely to the system in a first position, supplies acid gas solely to the device in a second position, and supplies a first part of the acid gas to the system and a second part of the acid gas to the device in a distributing position.

19 Claims, 2 Drawing Sheets

(56) References Cited

FOREIGN PATENT DOCUMENTS

| EP | 2702325 | 4/2015 | |
|---|---|---|---|
| WO | 2012146399 | 11/2012 | |
| WO | 2016037258 | 3/2016 | |
| WO | WO2016037258 | * | 3/2016 |

OTHER PUBLICATIONS

Georg Hammer et al., "Natural Gas", In: Ullmann's Encyclopedia of Industrial Chemistry, Weinheim: Wiley-VCH Verlag, Jul. 15, 2006, ISBN: 978-3-52-730673-2. XP055183954, pp. 761-766.
International Search Report and Written Opinion for PCT/EP2019/064832 dated Sep. 9, 2019.
International Search Report and Written Opinion for PCT/EP2019/064833 dated on Sep. 13, 2019.
International Preliminary Reporton Patentability received for PCT Patent Application No. PCT/EP2019/064833, dated Dec. 30, 2020, 15 pages (8 pages of English Translation and 7 pages of Original Document).

* cited by examiner

DEVICE AND METHOD FOR DESULFURIZING CRUDE OIL

CROSS-REFERENCE TO RELATED APPLICATIONS

The present invention is a 35 U.S.C. § 371 U.S. National Stage of PCT Application No. PCT/EP2019/064833, filed on Jun. 6, 2019, which claims priority to German Patent Application No. 10 2018 114 536.5, filed on Jun. 18, 2018. The entire content of each of the aforementioned patent applications is incorporated herein by reference.

BACKGROUND OF THE INVENTION

1. Field of the Invention

The invention relates to a device and a method for desulfurizing crude oil.

2. The Relevant Technology

After it has been extracted, crude oil first has to be processed. An essential step is the removal of sulfur. A central step in crude oil processing is desulfurization by means of hydrogenation in a hydrofiner. The sulfur-containing crude oil is first mixed with hydrogen and heated. In a reactor, the hot mixture reacts on a catalyst, as a result of which the sulfur-containing compounds contained in the crude oil are converted with the hydrogen to form hydrogen sulfide. The desulfurized crude oil is then separated from hydrogen sulfide, for example by means of amine scrubbing. While the desulfurized crude oil is supplied to be processed further, the hydrogen sulfide-containing exhaust gas stream, which is referred to as acid gas, is supplied to a sulfur recovery means, for example according to the Claus process. The sulfur recovery means provides elemental sulfur as a raw material.

Inter alia, crude oil is used to produce heavy oil for ships, for which a sulfur content of up to 3.5% is currently permitted. However, the sulfur content in heavy oil for ships must be reduced to 0.5% in the next few years. The aforementioned known methods can be used for this. However, this would mean that more elemental sulfur than before would be available as a raw material. Worldwide, however, there is no corresponding need for sulfur, and therefore it is difficult to put the elemental sulfur provided by desulfurization to use.

BRIEF SUMMARY OF THE INVENTION

The present invention has the object of providing a device and a method, the device and the method reducing the amount of sulfur produced during the desulfurization of crude oil and producing further products in addition or as an alternative to elemental sulfur.

This object is achieved in terms of the device by means of the features of claim 1 and in terms of the method by means of the features of claim 8. Advantageous embodiments and developments are provided in each of the dependent claims.

The invention provides a device for desulfurizing crude oil, comprising a) a desulfurization system for sulfur-containing crude oil which, in addition to the desulfurized crude oil, forms a hydrogen sulfide-containing acid gas, b) a system for extracting elemental sulfur and a hydrogen sulfide-containing tail gas as exhaust gas from the acid gas of the desulfurization system, c) a device for generating electricity and gypsum from the tail gas or the acid gas or from a mixture of the acid gas and the tail gas, d) a gas line system for supplying acid gas from the desulfurization system to the system for extracting elemental sulfur and to the device for generating electricity and gypsum, and for supplying tail gas from the system for extracting elemental sulfur to the device for generating electricity and gypsum, d1) wherein the gas line system has a gas distributing apparatus which supplies acid gas solely to the system for extracting elemental sulfur in a first position, supplies acid gas solely to the device for generating electricity and gypsum in a second position, and supplies a first part of the acid gas to the system for extracting elemental sulfur and a second part of the acid gas to the device for generating electricity and gypsum in a distributing position.

According to the invention, the device for generating electricity and gypsum comprises:

c1) an electricity generating apparatus comprising a combustion apparatus for combustion of the tail gas or the acid gas or a mixture of the tail gas and the acid gas, wherein the energy released during combustion is at least partly used to generate electricity, and c2) a flue gas desulfurization system for desulfurizing the sulfur oxide-containing combustion exhaust gases produced during combustion by forming gypsum.

The desulfurization in step b) can, for example, as described at the outset, take place by means of hydrogenation, in particular in a hydrofiner, and subsequent amine scrubbing. Elemental sulfur can be extracted according to step c), for example, by means of a Claus process.

The desulfurization system desulfurizes the crude oil, for example, as described above, by means of hydrogenation, in particular in a hydrofiner, and subsequent amine scrubbing. The system for extracting elemental sulfur from acid gas of the desulfurization system, for example, works using a Claus process.

The gas distributing apparatus can be designed such that, in the distributing position, it allows the amount of acid gas which is supplied as the first part of the acid gas to the system for extracting elemental sulfur and the amount of acid gas which is supplied as the second part of the acid gas to the device for generating electricity and gypsum to be adjusted. In other words, the ratio between the first part and the second part of the acid gas can be adjusted in the distributing position by means of the gas distributing apparatus.

The advantages of the invention are in particular that the sulfur oxide content in the purified exhaust gas after the flue gas desulfurization is further reduced by the upstream combination of a process for extracting elemental sulfur and a process for generating electricity by means of gas combustion and is thus lower than in the tail gas. Furthermore, the two sub-methods of sulfur extraction and combustion in order to generate electricity can be operated by adjusting the mix ratio between the tail gas and second part of the acid gas, each under optimized conditions, in particular with a preferred hydrogen sulfide content. A further advantage is that the hydrogen sulfide-containing gases no longer escape unused, but rather their energy is used since they are used to generate electricity.

A further important advantage is that the amount of elemental sulfur produced is reduced, since sulfur is now also stored in the form of gypsum. In comparison with elemental sulfur, there is a high demand for gypsum for a wide variety of gypsum products.

The combustion temperature in the combustion apparatus is preferably at least 1,000° C. This has the advantage that at such high combustion temperatures, even harmful accompanying substances such as carbon monoxide, benzene and other sulfur compounds burn completely to carbon dioxide, sulfur oxide and water and thus no longer occur in the combustion exhaust gas, or at least only in a significantly reduced amount.

According to a further development of the invention, the combustion apparatus of the electricity generating apparatus comprises a steam generator or is a steam generator that is part of the thermodynamic circuit of a steam-power process which in turn comprises a steam turbine downstream of the steam generator and a condenser downstream of the steam turbine. A generator driven by the steam turbine is provided for generating electricity. In this case, the energy released during combustion in the combustion apparatus is at least partly used to generate electricity in that the released energy is initially used at least partly in the steam generator in order to generate steam and the steam generated is then at least partly supplied to the steam turbine which drives a generator in order to generate electricity. Steam can also be at least partly diverted and supplied for thermal use, for example for heating or warming purposes.

Alternatively or additionally, the electricity generating apparatus can also comprise a gas turbine and/or a gas engine. In this case, a generator driven by the gas turbine and/or the gas engine is provided for generating electricity.

A further development of the invention provides:
- a measuring apparatus for determining the composition and/or the calorific value of the gas prior to combustion in the combustion apparatus (the tail gas or the acid gas or a mixture of the tail gas and the acid gas),
- an evaluation apparatus for comparing the determined composition with a predetermined composition or a predetermined composition range and/or for comparing the determined calorific value with a predetermined calorific value or a predetermined calorific value range, and
- a control apparatus and a supply apparatus for natural gas, wherein when a deviation from the predetermined composition and/or composition range or the predetermined calorific value and/or the predetermined calorific value range is determined by the evaluation apparatus, the control apparatus determines an additional proportion of natural gas required for correction and adds to the gas prior to combustion via the supply apparatus.

This ensures that the composition of the gases to be burned is as optimal as possible for the intended combustion. Alternatively or additionally, the mix ratio between the tail gas and the second part of the acid gas can be adjusted, in particular in order to adapt the hydrogen sulfide content in the gas supplied to the combustion apparatus, for example by means of the gas distributing apparatus.

For example, the predetermined composition or the predetermined composition range can include the following proportions in mol percent:
Hydrogen sulfide: 3% to 70%, in particular 40% to 60%, preferably approximately 50%, and/or
Carbon dioxide: 10% to 90%, in particular 40% to 60%, preferably approximately 50%.

Alternatively or additionally, the predetermined calorific value or the predetermined calorific value range can be 9 to 30 $MJ/m^3$ (in standard conditions), in particular 15 to 25 $MJ/m^3$ (in standard conditions), preferably approximately 20 $MJ/m^3$ (in standard conditions).

Since the combustion exhaust gases have a very high sulfur oxide content (in particular sulfur dioxide and sulfur trioxide content) in comparison with conventional combustion exhaust gases, it can be expedient to provide a multi-stage flue gas desulfurization system, preferably a multi-stage flue gas desulfurization system comprising a fixed-bed reactor for sulfur trioxide separation and a lime scrubber (wet scrubber) for sulfur dioxide separation.

For example, in a multi-stage flue gas desulfurization system, sulfur trioxide can be separated out in a fixed-bed reactor in one stage of the method, preferably in a first stage of the method. In another stage of the method, sulfur dioxide can be separated in the wet scrubber. Limestone, for example having a grain size of 4/6 mm, can be used in the fixed-bed reactor. Limestone powder, for example having the following grain size, can be used for wet washing: 90% below 0.063 mm.

A substantial advantage of this multi-stage flue gas desulfurization system is the separation of sulfur trioxide. The sulfur trioxide would pass through a pure wet scrubber almost unchanged, i.e. without the fixed-bed reactor in one of the stages of the method, the sulfur trioxide would reach the chimney and form aerosol mist at the chimney outlet. Particularly in the case of combustion of hydrogen sulfide-containing exhaust gases from the desulfurization of sulfur-containing crude oil provided according to the invention, the proportion of sulfur trioxide is relatively high, and therefore a multi-stage flue gas desulfurization system comprising a fixed-bed reactor for separating sulfur trioxide is of particular importance.

Using the device according to the invention, more than 99.9% of sulfur oxides can be separated from the acid gas or the remaining proportion of sulfur oxides is less than 100 $mg/m^3$ (in standard conditions).

According to a further development of the invention, the device for generating electricity and gypsum comprises a gypsum works which uses the gypsum produced during the flue gas desulfurization in order to produce gypsum products, in particular in the production of gypsum plasterboards and/or ready-to-use gypsum plaster mixes.

The aforementioned gypsum works can be set up such that it entirely or partly covers its electrical energy requirements from the electricity generating apparatus. The gypsum works can also be set up such that it draws its heat requirements entirely or partly from the combustion gases produced during combustion of the gases in the combustion apparatus and/or the electricity-generating processes, in particular the thermodynamic circuit of the steam-power process. If it is intended to draw the heat requirements entirely or partly from the steam-power process, this can be done by supplying steam directly to the gypsum works for heating or warming purposes via a diversion. For example, the steam can be used to heat the drying and/or calcining apparatuses of the gypsum works. A substantial advantage here is that in this way releasing carbon dioxide emissions into the environment can be avoided.

The method according to the invention for desulfurizing crude oil uses the device according to the invention and comprises the following steps:

a) providing sulfur-containing crude oil;
b) desulfurizing the sulfur-containing crude oil by means of the desulfurization system, wherein, in addition to the desulfurized crude oil, a hydrogen sulfide-containing acid gas is formed;
c) adjusting the gas distributing apparatus of the gas line system into the first position or into the second position or into the distributing position, wherein acid gas is supplied solely to the system for extracting elemental sulfur in a first position, acid gas is supplied solely to the device for generating electricity and gypsum in a second position, and a first part of the acid gas is supplied to the system for extracting elemental sulfur and a second part of the acid gas is supplied to the device for generating electricity and gypsum in a distributing position;
d) generating electricity and gypsum from the tail gas or the acid gas or from a mixture of the acid gas and the tail gas by means of the device for generating electricity and gypsum,
d1) wherein the tail gas or the acid gas or a mixture of the tail gas and the acid gas is supplied to the combustion apparatus of the electricity generating apparatus and burned there, wherein the energy released during combustion is at least partly used to generate electricity,
d2) wherein sulfur oxide-containing combustion exhaust gases produced during combustion are supplied for flue gas desulfurization by means of the flue gas desulfurization system, and
d3) wherein gypsum is formed during the flue gas desulfurization.

The advantages of the method according to the invention result from the advantages of the device according to the invention described above.

The combustion according to step d1) preferably takes place at a combustion temperature of at least 1,000° C.

A further development of the method is based on a device in which the combustion apparatus of the electricity generating apparatus comprises a steam generator or is a steam generator that is part of the thermodynamic cycle of a steam-power process which in turn comprises a steam turbine downstream of the steam generator and a condenser downstream of the steam turbine. In this case, in the method the energy released during combustion is at least partly used to generate electricity in that the released energy is initially used at least partly in the steam generator in order to generate steam and the steam generated is then at least partly supplied to the steam turbine which drives a generator in order to generate electricity. Steam can also be at least partly diverted and supplied for thermal use, for example for heating or warming purposes.

If the electricity generating apparatus of the device comprises a gas turbine and/or a gas engine, the electricity is generated by a generator driven by the gas turbine and/or the gas engine according to the method.

According to a further development of the method, the composition and/or the calorific value of the gas supplied to the electricity generating apparatus according to step d1) (the tail gas or the acid gas or a mixture of the tail gas and the acid gas) is determined prior to combustion in the combustion apparatus. The determined composition is compared with a predetermined composition or a predetermined composition range and/or the determined calorific value is compared with a predetermined calorific value or a predetermined calorific value range. If there is a deviation from the predetermined composition or composition range and/or from the predetermined calorific value or the predetermined calorific value range, an additional proportion of natural gas required for correction is determined and added to the gas prior to combustion.

For example, the predetermined composition or the predetermined composition range can include the following proportions in mol percent:
Hydrogen sulfide: 3% to 70%, in particular 40% to 70%, preferably approximately 50%, and/or
Carbon dioxide: 10% to 90%, in particular 40% to 60%, preferably approximately 50%.

Alternatively or additionally, the predetermined calorific value or the predetermined calorific value range can be 9 to 30 $MJ/m^3$ (in standard conditions), in particular 15 to 25 $MJ/m^3$ (in standard conditions), preferably approximately 20 $MJ/m^3$ (in standard conditions).

Since the combustion exhaust gases have a very high sulfur oxide content (in particular sulfur dioxide and sulfur trioxide content) in comparison with conventional combustion exhaust gases, it can be expedient to provide multi-stage flue gas desulfurization, preferably multi-stage flue gas desulfurization comprising a fixed-bed reactor for sulfur trioxide separation and a lime scrubber (wet scrubber) for sulfur dioxide separation. The examples and comments on the flue gas desulfurization system described for the device apply analogously to the method.

In a further development of the method, the gypsum produced during the flue gas desulfurization is supplied to a gypsum works in order to produce gypsum products, in particular gypsum plasterboards and/or ready-to-use gypsum plaster mixes.

The aforementioned gypsum works can entirely or partly cover its electrical energy requirements from the electricity generated according to step d1). The gypsum works can also draw its heat requirements entirely or partly from the combustion gases produced during combustion according to step d1) and/or the electricity-generating processes, in particular the thermodynamic circuit of the steam-power process.

If it is intended to draw all or part of the heat requirements from the steam-power process, steam can be diverted and supplied to the gypsum works for heating or warming purposes. For example, the steam can be used to heat the drying and/or calcining apparatuses of the gypsum works. A substantial advantage here is that in this way releasing carbon dioxide emissions into the environment can be avoided.

BRIEF DESCRIPTION OF THE DRAWINGS

The invention is explained in more detail below also with regard to further features and advantages on the basis of the description of embodiments and with reference to the accompanying schematic drawings, in which.

Corresponding parts and components are each identified by the same reference numerals in the figures.

DETAILED DESCRIPTION OF THE PREFERRED EMBODIMENTS

Figure 1:
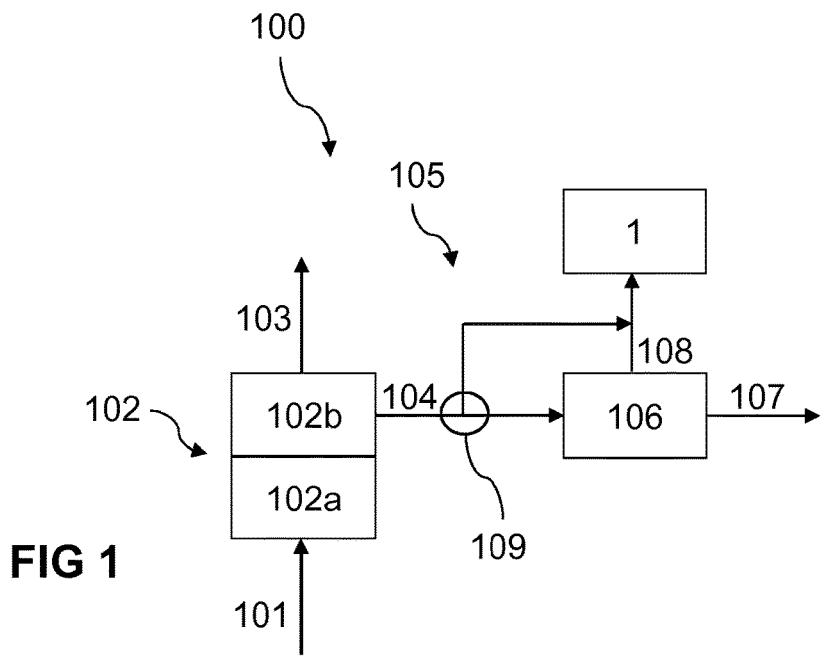
FIG. 1 shows an embodiment of the device according to the invention for desulfurizing crude oil.

FIG. 1 shows an embodiment of the device 100 according to the invention for desulfurizing sulfur-containing crude oil. The figure also illustrates the method according to the invention for desulfurizing crude oil.

The device 100 comprises a desulfurization system 102, to which sulfur-containing crude oil 101 is supplied. The desulfurization system 102 comprises a hydrogenation system 102a, preferably a hydrofiner, and a system 102b for carrying out amine scrubbing. During the desulfurization of the sulfur-containing crude oil 101 in the desulfurization system 102 by means of hydrogenation in the hydrogenation system 102a and amine scrubbing in the system 102b, desulfurized crude oil 103 and a hydrogen sulfide-containing acid gas 104 are formed. The desulfurized crude oil 103 can, optionally after further treatment steps, be delivered to consumers.

The device 100 further comprises a system 106 for extracting elemental sulfur 107, for example a Claus system for carrying out a Claus process. Acid gas 104 can be supplied from the desulfurization system 102 to this system 106 via a gas line system 105 which is described in more detail below. During the extraction of elemental sulfur 107 in this system 106, in addition to elemental sulfur 107, a hydrogen sulfide-containing tail gas 108 is formed as exhaust gas.

A device 1 for generating electricity 24 and gypsum 21 is provided as a further component of the device 100. The tail gas 108 or the acid gas 104 or a mixture of the acid gas 104 and the tail gas 108 can be supplied to this device 1 via the gas line system 105. The device 1 comprises an electricity generating apparatus 4 comprising a combustion apparatus 6 for combustion of the supplied gas, wherein the energy released during combustion is at least partly used to generate electricity. The device 1 further comprises a flue gas desulfurization system 19 for desulfurizing the sulfur oxide-containing combustion exhaust gases 18 produced during combustion by forming gypsum 21.

The already mentioned gas line system 105 is used to supply acid gas 104 from the desulfurization system 102 to the system 106 for extracting elemental sulfur 107 and to the device 1 for generating electricity 24 and gypsum 21, and to supply tail gas 108 from the system 106 for extracting elemental sulfur 107 to the device 1 for generating electricity 24 and gypsum 21. The gas line system 105 has a gas distributing apparatus 109 which supplies acid gas solely to the system 106 for extracting elemental sulfur 107 in a first position, supplies acid gas solely to the device 1 for generating electricity 24 and gypsum 21 in a second position, and supplies a first part of the acid gas 104 to the system 106 for extracting elemental sulfur 107 and a second part of the acid gas 104 to the device 1 for generating electricity 24 and gypsum 21 in a distributing position. The ratio between the first part and the second part of the acid gas 104 can be adjusted in the distributing position by means of the gas distributing apparatus 109.

Figure 2:
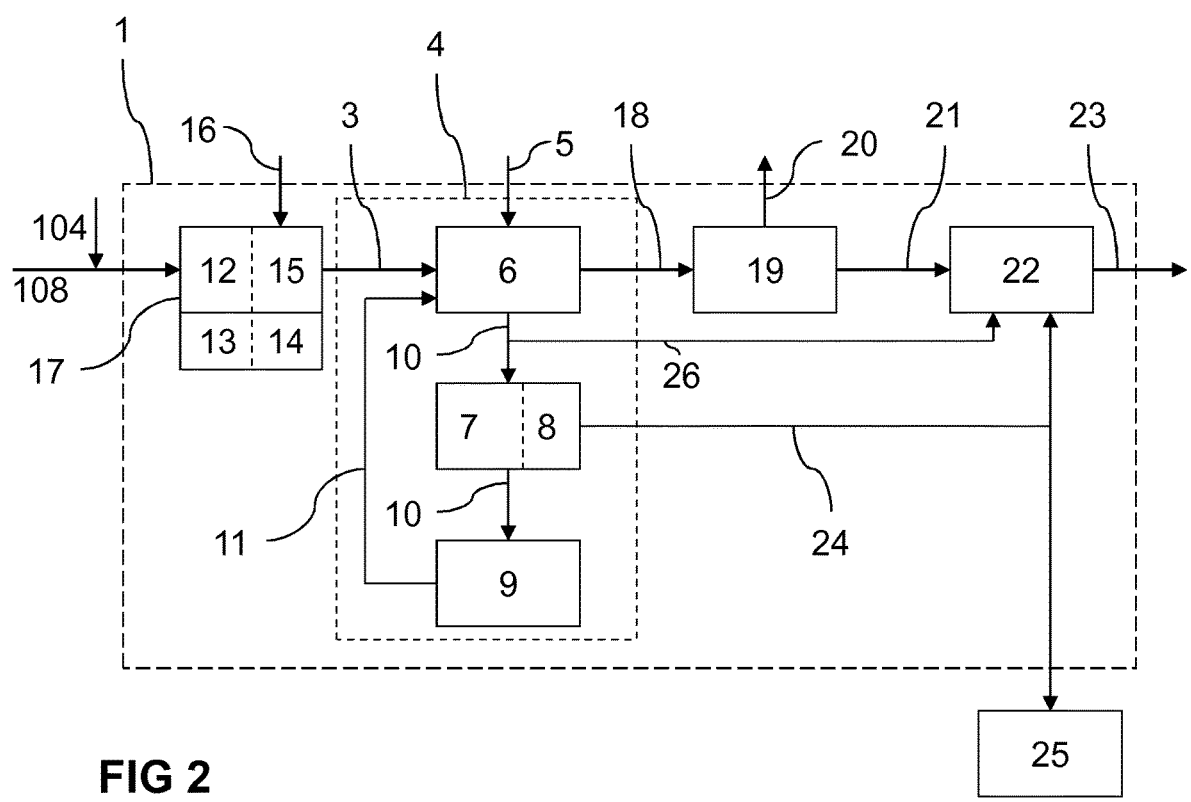
FIG. 2 shows a first embodiment of the device for generating electricity and gypsum.
Figure 3:
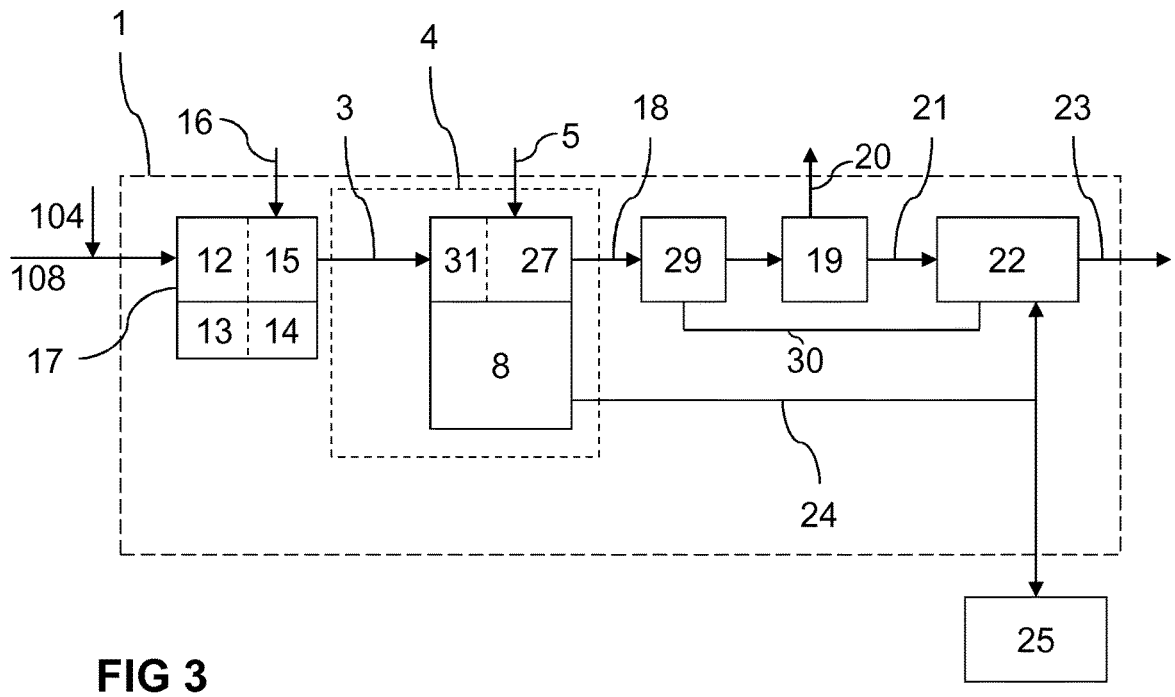
FIG. 3 shows a second embodiment of the device for generating electricity and gypsum.
Figure 4:
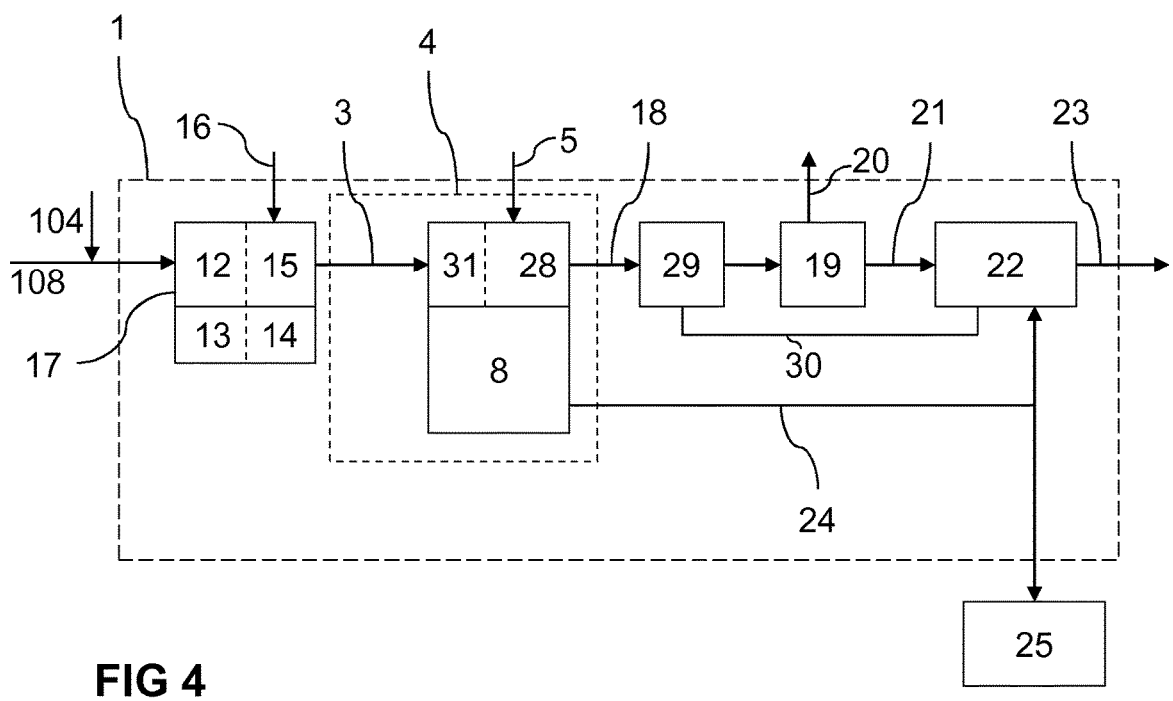
FIG. 4 shows a third embodiment of the device for generating electricity and gypsum.

FIG. 2 to FIG. 4 show three different embodiments of the device 1 for generating electricity and gypsum and thus also illustrate the method for generating electricity and gypsum.

In all three embodiments, the supply of tail gas 108 and/or acid gas 104 is shown on the left-hand side. As already explained, each gas can be supplied individually or as a mixture of the tail gas 108 and the acid gas 104 to device 1 and thus to the method for generating electricity and gypsum.

Specifically, gas is supplied to an electricity generating apparatus 4 and burned there, preferably with a supply of air 5, wherein the energy released during combustion is at least partly used to generate electricity.

In all the embodiments, it is shown that the gas is passed through a gas mixing apparatus 17 prior to being supplied to the electricity generating apparatus 4, of which the function is to provide a gas 3, of which the composition corresponds to a predetermined composition or within a predetermined composition range and/or of which the calorific value corresponds to a predetermined calorific value or is within a predetermined calorific value range. Examples of this predetermined composition or composition range and this predetermined calorific value or calorific value range have already been given above in the general description. Such a gas mixing apparatus 17 is not absolutely necessary to implement the invention.

The gas mixing apparatus 17 comprises a measuring apparatus 12, by means of which the composition and/or the calorific value of the incoming hydrogen sulfide-containing gases 3 (the tail gas 108 or the acid gas 104 or a mixture of the tail gas 108 and the acid gas 104) is determined. The gas mixing apparatus 17 further comprises an evaluation apparatus 13 which compares the determined composition with the predetermined composition or the predetermined composition range or the determined calorific value with a predetermined calorific value or a predetermined calorific value range.

Furthermore, the gas mixing apparatus 17 comprises a control apparatus 14 and a supply apparatus 15 for natural gas. When a deviation from the predetermined composition or composition range and/or from the predetermined calorific value or the predetermined calorific value range is determined by the evaluation apparatus 13, the control apparatus 14 determines an additional proportion of natural gas required for correction and it interacts with the supply apparatus 15 such that the determined proportion of natural gas required for correction is added to the gas 3 as admixture gas 16 prior to combustion via the supply apparatus 15. Alternatively or additionally, the control apparatus can also adapt the mix ratio between the tail gas 108 and the second part 104 of the acid gas for correction, for example via the gas distributing apparatus 109.

The hydrogen sulfide-containing gases 3, which may have been corrected in terms of their composition, are then supplied to the electricity generating apparatus 4. The electricity generating apparatus 4 in the embodiment according to FIG. 2 comprises a thermodynamic circuit 11 of a steam-power process. For this purpose, the electricity generating apparatus 4 comprises, as a combustion system 6, a steam generator, to which the gas 3 is supplied. The hydrogen sulfide-containing gases 3 are burned in the steam generator, with a supply of air 5, preferably at a combustion temperature of at least 1,000° C. The energy released is at least partly used in the steam generator to generate steam.

The electricity generating apparatus 4 further comprises a steam turbine 7 which is downstream of the steam generator. The steam 10 generated by the steam generator is supplied to the steam turbine 7. The steam turbine 7 is in turn coupled to a generator 8 which is driven by the steam turbine 7 in order to generate electricity 24. The electricity 24 generated can be supplied into the public grid 25 and/or made available to electrical consumers.

The electricity generating apparatus 4 further comprises a condenser 9 which is downstream of the steam turbine 7, i.e. after flowing through the steam turbine 7, the steam 10 is supplied to the condenser 9. This is preferably an air cooled condenser 9.

After condensing in the condenser 9, the condensed liquid and/or any steam which is still present is supplied back to the combustion apparatus 6 (here the steam generator) and therefore the thermodynamic circuit 11 of the steam-power process is closed.

Alternatively, it is also possible to interrupt the thermodynamic circuit 11 and use the thermal energy still contained in the steam after flowing through the steam turbine 7 for other purposes, for example for heating purposes in the context of local or district heating facilities, according to the principle of classic power-heat coupling. In this case, water must be supplied to the thermodynamic circuit 11 of the steam-power process of the electricity generating apparatus 4 for compensation upstream of the steam generator, i.e. there is no longer a circuit process in the actual sense. This alternative is not shown in the figures.

When the hydrogen sulfide-containing gases 3 are burned in the combustion apparatus 6 (here the steam generator), combustion gases 18 are produced. These are supplied to a flue gas desulfurization system 19, purified there and then released as purified exhaust gas 20, for example directly into the environment, but there can also be further exhaust gas purification steps upstream or downstream.

Due to the hydrogen sulfide content of the starting gases, the combustion gases 18 have a very high proportion of sulfur dioxide and sulfur trioxide in comparison with the combustion exhaust gases of known systems. Accordingly, a suitable flue gas desulfurization system 19 must be provided, for example a multi-stage flue gas desulfurization system, preferably a multi-stage flue gas desulfurization system comprising a fixed-bed reactor for sulfur trioxide separation and a lime scrubber for sulfur dioxide separation. The water required for the flue gas desulfurization can be drawn from the sea by means of sea water pumps if the device is located near the sea. After the flue gas desulfurization system 19, the purified exhaust gas 20 can be released into the environment.

During the flue gas desulfurization using the flue gas desulfurization system 19, gypsum 21 is produced which is supplied to a gypsum works 22 in order to produce gypsum products 23. For example, gypsum plasterboards or ready-to-use gypsum plaster mix are produced in this gypsum works 22 using the gypsum 21.

The gypsum works 22 is designed and set up such that it entirely or partly covers its electrical energy requirements from the electricity generated by the electricity generating apparatus 4, i.e. the gypsum works 22 represents one of the aforementioned electrical consumers, to which the electricity generating apparatus 4 provides the electricity 24 generated from the combustion of the hydrogen sulfide-containing exhaust air.

Furthermore, the gypsum works 22 covers its heat requirements entirely or partly by diverting steam 26 from the above-described thermodynamic circuit 11 of the steam-power process of the electricity generating apparatus 4 and drawing thermal energy from this diverted steam 26 for heating purposes. For example, the diverted steam 26 can be used in this way for calcining the gypsum 21 and/or for drying gypsum plasterboards in the gypsum works 22.

After this thermal use, the diverted steam 26 can be released or used in some other way. In this case, water must be supplied to the thermodynamic circuit 11 of the steam-power process of the electricity generating apparatus 4 to compensate for it or the diverted steam 26 is supplied back to the thermodynamic circuit 11 of the steam-power process of the electricity generating apparatus 4 after the thermal use such that this circuit is substantially still closed with regard to the steam. Guiding the diverted steam 26 further after the thermal use and the optionally required supply of water into the thermodynamic circuit 11 are not shown in FIG. 2.

The second embodiment according to FIG. 3 and the third embodiment according to FIG. 4 correspond to the first embodiment with regard to the gas supply and the gas mixing apparatus 17 and therefore reference is made to the preceding explanations regarding FIG. 2.

However, the second and third embodiments differ from the first embodiment in the electricity generating apparatus 4 used. Instead of a steam-power process, the electricity generating apparatus 4 comprises a gas turbine 27 in the second embodiment and a gas engine 28 in the third embodiment, each having a compressor 31 upstream for the supplied gas 3. The hydrogen sulfide-containing gases 3, which may have been corrected in terms of their composition, are supplied to this gas turbine 27 or this gas engine 28 and are burned in the gas turbine 27 or the gas engine 28, with a supply of air 5, preferably at a combustion temperature of at least 1,000° C. The gas turbine 27 or the gas engine 28 are coupled to a generator 8 which is driven by the gas turbine 27 or the gas engine 28 in order to generate electricity 24. As in the first embodiment according to FIG. 1, the electricity 24 generated can in turn be fed into the public grid 25 and/or made available to electrical consumers.

When the hydrogen sulfide-containing gases 3 are burned in the gas turbine 27 or the gas engine 28, combustion gases 18 are produced. These are conducted through a heat exchanger 29 for further energetic utilization before being guided further to a flue gas desulfurization system 19. In the heat exchanger 29, thermal energy is drawn from the combustion gases 18 and supplied to a gypsum works 22 via a suitable fluid circuit 30 such that this gypsum works 22 can entirely or partly cover its heat requirements. For example, the heat drawn from the combustion gases 18 can be used in this way for calcining the gypsum 21 and/or for drying gypsum plasterboards in the gypsum works 22.

All the further features of further guiding the combustion gases 18, the flue gas desulfurization system 19 and the gypsum works 22 correspond to the solution already discussed with reference to the first embodiment according to FIG. 2, and therefore reference is made to the above explanations in this regard.

LIST OF REFERENCE NUMBERS

1 Device for generating electricity and gypsum
3 Gas
4 Electricity generating apparatus
5 Air
6 Combustion apparatus
7 Steam turbine
8 Generator
9 Condenser
10 Steam
11 Thermodynamic cycle of the steam-power process
12 Measuring apparatus
13 Evaluation apparatus
14 Control apparatus
15 Supply apparatus
16 Admixture of natural gas
17 Gas mixing apparatus
18 Combustion gases
19 Flue gas desulfurization system
20 Purified exhaust gas
21 Gypsum
22 Gypsum works
23 Gypsum products 24 Electricity
25 Public grid
26 Steam diverted for heat requirements of the gypsum works
27 Gas turbine
28 Gas engine
29 Heat exchanger
30 Fluid circuit
31 Compressor
100 Device for desulfurizing crude oil
101 Sulfur-containing crude oil
102 Desulfurization system for sulfur-containing crude oil
102a Hydrogenation system
102b System for carrying out amine scrubbing
103 Desulfurized crude oil
104 Acid gas
105 Gas line system
106 System for extracting elemental sulfur 107 from acid gas 104
107 Elemental sulfur
108 Tail gas
109 Gas distributing apparatus

The invention claimed is:

1. A device for desulfurizing crude oil, comprising:
a) a desulfurization system for heavy metal-containing crude oil which, in addition to the desulfurized crude oil, forms a hydrogen sulfide-containing acid gas;
b) a system for extracting elemental sulfur and a hydrogen sulfide-containing tail gas as exhaust gas from the acid gas of the desulfurization system;
c) a device for generating electricity and gypsum from the tail gas or the acid gas or from a mixture of the acid gas and the tail gas, the device comprising:
c1) an electricity generating apparatus comprising a combustion apparatus for combustion of the tail gas or the acid gas or a mixture of the tail gas and the acid gas, wherein energy released during combustion is at least partly used to generate electricity;
c2) a flue gas desulfurization system for desulfurizing sulfur oxide-containing combustion exhaust gases produced during combustion by forming gypsum;
d) a gas line system for supplying acid gas from the desulfurization system to the system for extracting elemental sulfur and to the device for generating electricity and gypsum, and for supplying tail gas from the system for extracting elemental sulfur to the device for generating electricity and gypsum;
d1) wherein the gas line system has a gas distributing apparatus which supplies acid gas solely to the system for extracting elemental sulfur in a first position, supplies acid gas solely to the device for generating electricity and gypsum in a second position, and supplies a first part of the acid gas to the system for extracting elemental sulfur and a second part of the acid gas to the device for generating electricity and gypsum in a distributing position;
e) a measuring apparatus for determining a composition and/or a calorific value of the gas prior to combustion in the combustion apparatus;
f) an evaluation apparatus for comparing the determined composition with a predetermined composition or a predetermined composition range and/or for comparing the determined calorific value with a predetermined calorific value or a predetermined calorific value range, and
g1) a control apparatus and a supply apparatus for natural gas, wherein when a deviation from the predetermined composition and/or composition range or the predetermined calorific value and/or the predetermined calorific value range is determined by the evaluation apparatus, the control apparatus determines an additional proportion of natural gas required for correction and adds to the gas prior to combustion via the supply apparatus.

2. The device according to claim 1, wherein:
the combustion apparatus of the electricity generating apparatus comprises a steam generator that is part of a thermodynamic circuit of a steam-power process, the thermodynamic circuit comprising a steam turbine downstream of the steam generator and a condenser downstream of the steam turbine, and
the steam turbine drives a generator for generating electricity.

3. The device according to claim 1, wherein:
the electricity generating apparatus comprises a gas turbine and/or a gas engine, and
a generator driven by the gas turbine and/or the gas engine is provided for generating electricity.

4. The device according to claim 1, wherein:
the predetermined composition or the predetermined composition range includes the following proportions in mol percent:
Hydrogen sulfide: 3% to 70%, and/or
Carbon dioxide: 10% to 90%;
and/or the predetermined calorific value or the predetermined calorific value range is from 9 to 30 $MJ/m^3$ (in standard conditions).

5. The device according to claim 1, wherein the device for generating electricity and gypsum comprises a gypsum works which uses the gypsum produced during the flue gas desulfurization to produce gypsum products, in particular in the production of gypsum plasterboards and/or ready-to-use gypsum plaster mixes.

6. The device according to claim 5, wherein:
the gypsum works entirely or partly covers its electrical energy requirements by means of electricity from the electricity generating apparatus, and/or
the gypsum works draws its heat requirements entirely or partly from combustion gases produced during combustion of the gases in the combustion apparatus and/or electricity-generating processes, in particular a thermodynamic circuit of a steam-power process.

7. A method for desulfurizing crude oil using a device for generating electricity and gypsum from a tail gas or an acid gas or from a mixture of the acid gas and the tail gas, the method comprising the following steps:
a) providing sulfur-containing crude oil;
b) desulfurizing the sulfur-containing crude oil by means of a desulfurization system, wherein, in addition to the desulfurized crude oil, a hydrogen sulfide-containing acid gas is formed;
c) adjusting a gas distributing apparatus of a gas line system into a first position or into a second position or into a distributing position, wherein acid gas is supplied solely to the system for extracting elemental sulfur in the first position, acid gas is supplied solely to the device for generating electricity and gypsum in the second position, and a first part of the acid gas is supplied to the system for extracting elemental sulfur and a second part of the acid gas is supplied to the device for generating electricity and gypsum in the distributing position;

d) generating electricity and gypsum from the tail gas or the acid gas or from a mixture of the acid gas and the tail gas by means of the device for generating electricity and gypsum,
- d1) wherein the tail gas or the acid gas or a mixture of the tail gas and the acid gas is supplied to a combustion apparatus of the electricity generating apparatus and burned there, wherein energy released during combustion is at least partly used to generate electricity;
- d2) wherein sulfur oxide-containing combustion exhaust gases produced during combustion are supplied for flue gas desulfurization by means of a flue gas desulfurization system, and
- d3) wherein gypsum is formed during the flue gas desulfurization;

e) determining a composition and/or a calorific value of the gas supplied to the device for generating electricity prior to combustion in the combustion apparatus;

f) comparing at least one of the determined composition with a predetermined composition or a predetermined composition range and the determined calorific value with a predetermined calorific value or a predetermined calorific value range, and g) at least one of
- g1) determining and adding to the gas prior to combustion an additional proportion of natural gas required for correction if there is a deviation from the predetermined composition or composition range or from the predetermined calorific value or the predetermined calorific value range, and
- g2) adapting a mix ratio between the tail gas and the second part of the acid gas for correction.

8. The method according to claim 7, wherein the combustion according to step d1) takes place at a combustion temperature of at least 1,000° C.

9. The method according to claim 7, wherein:
the combustion apparatus of the electricity generating apparatus comprises a steam generator or is a steam generator that is part of a thermodynamic circuit of a steam-power process which in turn comprises a steam turbine downstream of the steam generator and a condenser downstream of the steam turbine, and
the energy released during combustion is at least partly used to generate electricity in that the released energy is initially used at least partly in the steam generator in order to generate steam and the steam generated is then at least partly supplied to the steam turbine which drives a generator in order to generate electricity.

10. The method according to claim 7, wherein:
the electricity generating apparatus comprises a gas turbine and/or a gas engine, and
the electricity is generated by a generator driven by the gas turbine and/or the gas engine.

11. The method according to claim 7, wherein:
the predetermined composition or the predetermined composition range includes the following proportions in mol percent:
Hydrogen sulfide: 3% to 70%, and/or
Carbon dioxide: 10% to 90%;
and/or wherein the predetermined calorific value or the predetermined calorific value range is from 9 to 30 $MJ/m^3$ (in standard conditions).

12. The method according to claim 7, wherein the gypsum produced during the flue gas desulfurization is supplied to a gypsum works to produce gypsum products, in particular gypsum plasterboards and/or ready-to-use gypsum plaster mixes.

13. The method according to claim 12, wherein:
the gypsum works entirely or partly covers its electrical energy requirements from electricity generated, and/or
the gypsum works draws its heat requirements entirely or partly from the combustion gases produced during combustion, and/or electricity-generating processes, in particular a thermodynamic circuit of a steam-power process.

14. A device for desulfurizing crude oil, comprising:
a) a desulfurization system for heavy metal-containing crude oil which, in addition to the desulfurized crude oil, forms a hydrogen sulfide-containing acid gas;
b) a system for extracting elemental sulfur and a hydrogen sulfide-containing tail gas as exhaust gas from the acid gas of the desulfurization system;
c) a device for generating electricity and gypsum from the tail gas or the acid gas or from a mixture of the acid gas and the tail gas, the device comprising:
- c1) an electricity generating apparatus comprising a combustion apparatus for combustion of the tail gas or the acid gas or a mixture of the tail gas and the acid gas, wherein energy released during combustion is at least partly used to generate electricity;
- c2) a flue gas desulfurization system for desulfurizing sulfur oxide-containing combustion exhaust gases produced during combustion by forming gypsum;

d) a gas line system for supplying acid gas from the desulfurization system to the system for extracting elemental sulfur and to the device for generating electricity and gypsum, and for supplying tail gas from the system for extracting elemental sulfur to the device for generating electricity and gypsum;
- d1) wherein the gas line system has a gas distributing apparatus which supplies acid gas solely to the system for extracting elemental sulfur in a first position, supplies acid gas solely to the device for generating electricity and gypsum in a second position, and supplies a first part of the acid gas to the system for extracting elemental sulfur and a second part of the acid gas to the device for generating electricity and gypsum in a distributing position;

e) a measuring apparatus for determining a composition and/or a calorific value of the gas prior to combustion in the combustion apparatus;

f) an evaluation apparatus for comparing the determined composition with a predetermined composition or a predetermined composition range and/or for comparing the determined calorific value with a predetermined calorific value or a predetermined calorific value range, and g) a control apparatus, wherein the control apparatus adapts a mix ratio between the tail gas and the second part of the acid gas for correction.

15. The device according to claim 14, wherein:
the combustion apparatus of the electricity generating apparatus comprises a steam generator that is part of a thermodynamic circuit of a steam-power process, the thermodynamic circuit comprising a steam turbine downstream of the steam generator and a condenser downstream of the steam turbine, and
the steam turbine drives a generator for generating electricity.

16. The device according to claim 14, wherein:
the electricity generating apparatus comprises a gas turbine and/or a gas engine, and
a generator driven by the gas turbine and/or the gas engine is provided for generating electricity.

17. The device according to claim 14, wherein:
the predetermined composition or the predetermined composition range includes the following proportions in mol percent:
Hydrogen sulfide: 3% to 70%, and/or
Carbon dioxide: 10% to 90%;
and/or the predetermined calorific value or the predetermined calorific value range is from 9 to 30 MJ/m$^3$ (in standard conditions).

18. The device according to claim 14, wherein the device for generating electricity and gypsum comprises a gypsum works which uses the gypsum produced during the flue gas desulfurization to produce gypsum products, in particular in the production of gypsum plasterboards and/or ready-to-use gypsum plaster mixes.

19. The device according to claim 14, wherein:
the gypsum works entirely or partly covers its electrical energy requirements by means of electricity from the electricity generating apparatus, and/or
the gypsum works draws its heat requirements entirely or partly from combustion gases produced during combustion of the gases in the combustion apparatus and/or electricity-generating processes, in particular a thermodynamic circuit of a steam-power process.

\* \* \* \* \*